United States Patent [19]

Basille et al.

[11] Patent Number: 5,048,108
[45] Date of Patent: Sep. 10, 1991

[54] DATA PROCESSING DEVICE WITH PROCESSORS ARRANGED IN A LOOPED LINE CONFIGURATION USING HELICOIDAL ADDRESSING FOR PROCESSING DATA RELATING TO PIXELS

[75] Inventors: Jean-Luc Basille, Ramonville; Hassane Es-Safi, Muret; Jean-Yves Latil, Lacroix Falgarde; Didier Juvin, Paris, all of France

[73] Assignees: Commissariat, a l'Energie Atomique, Paris; ADERMIP (Association pour le Development de l'Enseignement de l'Economic et et des Recherches de Midi Pyrenees, Toulouse, both of France

[21] Appl. No.: 271,741

[22] Filed: Nov. 15, 1988

[30] Foreign Application Priority Data

Nov. 16, 1987 [FR] France .................... 87 15785

[51] Int. Cl.[5] .......................... G06K 9/00
[52] U.S. Cl. ......................... 382/49; 382/27; 358/489; 364/229.3
[58] Field of Search ............ 382/27, 49; 358/489; 364/229.3

[56] References Cited

U.S. PATENT DOCUMENTS 3,814,906  6/1974  Trotta .................... 235/434
4,908,751  3/1990  Smith ..................... 364/200
4,949,390  8/1990  Iverson et al. ............ 382/55

OTHER PUBLICATIONS

Conference Proceedings, the 10th International Symposium on Computer Architecture, pp. 395-400.
IEEE 1983 International Symposium on Circuits and Systems, vol. 1, pp. 405-408.

Primary Examiner—Michael Razavi
Assistant Examiner—Daniel Santos
Attorney, Agent, or Firm—Michael N. Meller

[57] ABSTRACT

The present invention concerns a data-processing device relating to pixels. This data is marked per line and per column. The device comprises processing means comprising at least four identical processors, (PE0, PE1, PE2, PE3) respectively connected to memories (MEM0, MEM1, MEM2, MEM3) marked on row $J=0$ to row $J=3$. The data relating to the pixels to be processed are recorded in the memories according to an helicoidal addressing. Connection means (1C0, 1C1, ... , 2C0, 2CE1, ... ) are provided so that the processors are connected according to a looped line configuration.

3 Claims, 5 Drawing Sheets

|    | MEM0 | MEM1 | MEM2 | MEM3 |
|----|------|------|------|------|
| 0  | 0,0  | 0,1  | 0,2  | 0,3  |
| 1  | 0,4  | 0,5  | 0,6  | 0,7  |
| 2  | 0,8  | 0,9  | 0,10 | 0,11 |
| 3  | 0,12 | 0,13 | 0,14 | 0,15 |
| 4  | 1,3  | 1,0  | 1,1  | 1,2  |
| 5  | 1,7  | 1,4  | 1,5  | 1,6  |
| 6  | 1,11 | 1,8  | 1,9  | 1,10 |
| 7  | 1,15 | 1,12 | 1,13 | 1,14 |
| 8  | 2,2  | 2,3  | 2,0  | 2,1  |
| 9  | 2,6  | 2,7  | 2,4  | 2,5  |
| 10 | 2,10 | 2,11 | 2,8  | 2,9  |
| 11 | 2,14 | 2,15 | 2,12 | 2,13 |
| 12 | 3,1  | 3,2  | 3,3  | 3,0  |
| 13 | 3,5  | 3,6  | 3,7  | 3,8  |
| 14 | 3,9  | 3,10 | 3,11 | 3,8  |
| 15 | 3,13 | 3,14 | 3,15 | 3,12 |
| 16 | 4,0  | 4,1  | 4,2  | 4,3  |
| 17 | 4,4  | 4,5  | 4,6  | 4,7  |
| 18 | 4,8  | 4,9  | 4,10 | 4,11 |
| 19 | 4,12 | 4,13 | 4,14 | 4,15 |
|    | 15,1 | 15,2 | 15,3 | 15,0 |

1st Row: rows 0–3
2nd Row: rows 4–7
3rd Row: rows 8–11
4th Row: rows 12–15
5th Row: rows 16–19
16th Row

DATA PROCESSING DEVICE WITH PROCESSORS ARRANGED IN A LOOPED LINE CONFIGURATION USING HELICOIDAL ADDRESSING FOR PROCESSING DATA RELATING TO PIXELS

FIELD OF THE INVENTION

The present invention concerns a data processing device relating to pixels.

It is mainly used for recognizing forms.

BACKGROUND OF THE INVENTION

It is known that the majority of data processings relating to pixels, displayed at the conjunctions of predetermined lines and columns, comprise memory means for storing this data, and means for processing stored data. The data relating to a pixel is processed with respect to data relating to each of the pixels situated at least in the immediate vicinity of the pixel in question. Generally speaking, in order to process data relating to a pixel, denoted by a line number and a column number at the conjunction where this pixel is situated, account is taken of the data relating to the pixels situated in a generally square window having at least 9 pixels. This window contains the processed pixel which occupies its center, as well as eight surrounding pixels.

The surrounding pixels are situated at the conjunctions of lines and columns adjacent to the line and column determining the location of the pixel to be processed.

Various devices are known which make it possible to process data relating to each pixel by taking into account the data of the surrounding pixels situated in a predetermined window.

One of these devices uses a "pipeline" structure which splits the processing to be carried out into stages, each stage being operated by a specific module. The different modules may carry out parallel processing, each module operating on the results of the preceding module. This type of device has limited efficiency by splitting the processings into different stages and is ill-suited to different types of processings.

Another device uses an architecture known as systolic network. This architecture may be considered as a generalization of the pipeline structure. In a systolic network, each module may comprise several upstream modules and several downstream modules, but this structure is still more specific than the pipeline structure and more difficult to implement.

Finally, a further device uses structures in the form of processor arrays constituted by elementary processors, disposed in generally rectangular networks. Each elementary processor can be associated with one pixel, or a group of pixels, of the picture and has access to the adjacent pixels by means of links for interconnecting with the adjacent elementary processors within the network.

This is an advantageous structure since it establishes perfect correspondence with the splitting up of the picture into pixels marked by lines or columns. It allows for very high parallelism since all the pixels can be simultaneously processed. However, owing to reasons of integration technology, it presents the drawback of having a number of elementary processors less than the dimensions of the picture which may comprise 128×128 pixels or even 512×512 pixels. The cost of devices using structures in the form of processor arrays is extremely high. Moreover, it is difficult to implement parallel algorithms in such processor arrays and especially scanning algorithms.

SUMMARY OF THE INVENTION

The object of the present invention is to overcome these drawbacks, and especially to supply a device for processing data relating to pixels marked by lines and columns, which is closely related to the "processor arrays" structure, without, however, requiring such a high number of processors, thus simplifying and reducing the cost of producing this type of "integrated circuit". These objectives are achieved by means of judicious interconnections between processors by virtue of a helicoidal organization of the data respectively recorded in the memories of the various processors thus interconnected and by virtue of a special addressing of the data relating to the pixels to be processed. The object of this invention is also to simplify the programming of algorithms of complicated processing and to thus reduce the cost of image processings, while allowing for the production of processing modules with several interconnected and easily integrable processors.

As shall be seen subsequently, many processors are connected on a line relooped onto itself. Each processor carries out the same processing at the same moment, but concerning its own data, and each processor may be connected, not only to its left and righthand neighbors (distance 1), but also to its left and righthand neighbors situated at distance 2 and distance 3.

The object of the invention is to produce a device for processing data relating to pixels marked by lines and columns, comprising memory means for storing this data, and means for processing the stored data relating to each pixel according to the data relating to each pixel situated at least in the immediate vicinity of the processed pixel so as to process the data relating to the pixels situated in the windows, each having at least nine pixels, wherein the processing means comprise a group of four identical processors marked from at least row $j=0$ to row $j=3$ so as to process the pixels situated on the successive lines and belonging respectively to the same predetermined successive columns, the memorization means comprising at least four memories marked from at least row $j=0$ to row $j=3$ and respectively connected to the processors, the data relating to the pixels of the predetermined lines and columns being stored in these memories according to a "helicoidal" addressing, the processing means also comprising connection means marked from at least row $j=0$ to $j=3$ so as to connect each processor to its memory and interconnect each processor with its adjacent processor of the group at least to distance 1 and distance 2, so that the processors are interconnected according to their successive rows and according to a looped line configuration, the connection means being moreover connected to a control unit for sequencing the processing and addressing operations carried out by the processors.

According to another characteristic of the invention, each processor is directly connected to its memory to record data inside this memory, the connection means comprising, as regards each processor, first and second switching circuits connected to the the sequencing unit, each first switching circuit being moreover connected to the corresponding memory and processor, each second switching circuit being connected to the corresponding processor, this first switching circuit of each processor being connected to the second switching circuits of two adjacent processors by means of bidirectional lines, the first and second switching circuit of each processor of row J between at least J=0 and J=3 comprising means for:

a)—transmitting the data read in the memory of the processor towards this processor (FROME, TOPE);

b)—transmitting the data supplied by the processor towards the memory of this processor (TOME, FROPE);

c)—transmitting the data read in the memory of a row J processor towards a row J+1 processor (FROME, TOPED, FROMG);

d)—transmitting the data read in the memory of a row J processor towards a row J−1 processor (FROME, TOPEG, FROMD);

e)—transmitting the data supplied by a row J processor towards a row J+1 processor (TOMD, FROPEG, TOPE);

f)—transmitting the data supplied by a row J processor towards a row J−1 processor (TOMG, FROPED, TOPE);

g)—transmitting the data of the memory of a row J processor towards a row J+2 processor (FROME, TOPEG, FROMD, VDO, VGI);

h)—transmitting the data of the memory of a row J processor towards a row J−2 processor (FROME, TOPEG, FROMD, VGO, VDI);

i)—transmitting the data of a row J processor towards a row J+2 processor (TOMD, FROPEG, TOPEG, FROMG);

j)—transmitting the data of a row J processor towards a row J−2 processor (TOMG, FROPED, TOPEG, FROMD);

k)—transmitting the data of a row J processor towards a row J+3 processor (TOMD, FROPEG, TOPED, FROMG, VDO, VGI);

l)—transmitting the data of a row J processor towards a row J−3 processor (TOMG, FROPED, TOPEG, FROMD, VGO, VDI).

According to another characteristic, the first switching circuit of row J comprises a multiplexor having a first input connected to the memory of the row J processor so as to receive the data (FROME) read from this memory, a second input connected to an output of the second switching circuit of row J−1 so as to receive the data (FROPEG) supplied by this second switching circuit of row J−1, and a third input connected to an output of the second switching circuit of row J+1 so as to receive the data (FROPED) supplied by this second switching circuit of row J+1, this multiplexor comprising an output connected to an input (22, TOPE) of the row J processor, to an input (TOPEG) of the second switching circuit of row J−1, and to an input (TOPED) of the second switching circuit of row J+1 so as to supply the data received by the multiplexor to the row J processor or to the second switching circuits of rows J−1 or J+1 according to the sequencing commands received on the control inputs of the multiplexor and connected to outputs of the sequencing means.

According to a further characteristic, each second switching circuit of row J comprises a multiplexor respectively connected by a first input to an output of the row J processor in order to receive the data supplied by this processor, a second input connected to the output of the multiplexor of the first switching circuit of row J in order to receive the data (FROME, TOPE) originating from the row J memory, a third input and a fourth input respectively connected to outputs of the second switching circuit of row J−1 in order to respectively receive the data (VGI, FROMG) supplied by the row J−1 processor and by the row J−1 memory, a fifth input and a sixth input respectively connected to outputs of the second switching circuits of row J+1 so as to respectively receive the data (VDI, FROMD) supplied by the row J+1 processor and the row J+1 memory, an output of this multiplexor being connected to an input of the row J processor, this second switching circuit of row J also comprising a logic circuit having a first input connected to an output of the second switching circuit of row J+1 in order to receive the data (FROMD) supplied by the row J+1 memory, a second input connected to an output of the row J processor in order to receive the data supplied by this processor, and a third input connected to an output of the second switching circuit of row J−1 in order to receive the data (FROMG) supplied by the row J−1 memory, this logic circuit having two outputs respectively connected to two inputs of the second switching circuit of row J−1 in order to supply data (TOMG, VGO) to the row J−1 memory and processor, and having two other outputs respectively connected to two inputs of the second switching circuit of row J+1 so as to supply data (TOMD, VDO) to the row J+1 memory and processor, the logic circuit and multiplexor of the second switching circuit of row J being connected by control inputs to outputs of the sequencing unit so as to manage the sequencing of data supplied by the outputs of the logic circuit and the multiplexor of the second switching circuit of row J.

BRIEF DESCRIPTION OF THE DRAWINGS

The characteristics and advantages of the invention shall be more readily understood from reading the following description, together with the annexed drawings in which:

FIG. 2 shows a helicoidal addressing example for data distributed inside the four memories of four processors for an image comprising 16×16 pixels, FIG. 3 diagrammatically shows a device according to the invention, FIG. 4 diagrammatically shows a first switching circuit incorporated in the device of the invention, FIG. 5 diagrammatically shows a second switching circuit incorporated in the device of the invention.

DETAILED DESCRIPTION OF THE PREFERRED EMBODIMENTS

Figure 1:
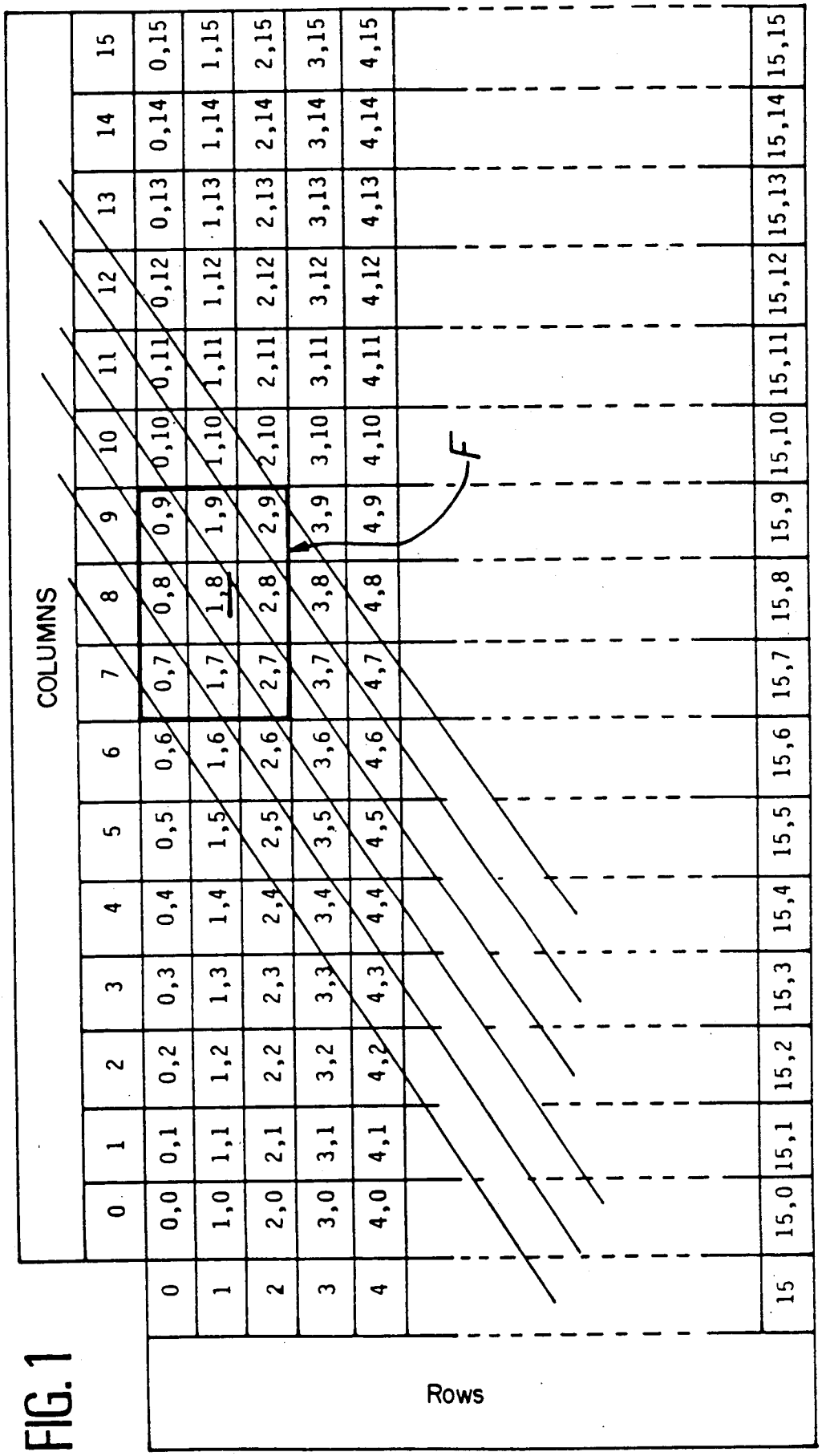
FIG. 1 shows a conventional example for data addressing in a memory, this data relating to the pixels of an image comprising 16×16 pixels.

FIG. 1 is a table diagrammatically representing the various addresses of a memory in which are recorded the respective pixel data. In this example, it is considered that the data recorded relate to pixels situated at the conjunction of the columns numbered from 0 to 15 and of the lines numbered from 0 to 15.

Each pair of figures, such as 0.0 for example, denotes a memory address in which is recorded the data relating to a pixel situated at the conjunction of the column number 0 and the line number 0. The values of the data (for example, the intensity of each pixel) are not specified in this table.

Similarly, the pair of figures 1.3 denotes the memory address in which is recorded the data relating to the pixel situated at the conjunction of line 1 and column 3. This organization for addressing data inside a memory is the most conventional form of organization. As regards the state of the technique, the known devices for processing data make it possible to process the data relating to each pixel contained in this memory by processing, not only the data relating to a pixel in question, but also the data relating to pixels adjacent to the latter and contained in a window with predetermined dimensions.

This is why the data relating to the pixel situated at the address 1.8 is processed by taking account of the data of the adjacent pixels contained, for example, in a window F with dimensions of 3×3 containing 9 pixels. This window may have larger dimensions and contain, for example, 5×5=25 pixels, the pixel to be processed still occupying the center of the window.

By known means, different marking distances of pixels adjacent to the pixel in question are defined. This is why in the selected example where the pixel to be processed occupies the address 1.8, it is regarded that the pixel whose data occupy the address 1.8 is situated at the distance 0 from the selected pixel. Similarly, it is regarded that the pixels whose data occupy the addresses 1.7 and 1.9 and the addresses 0.8 and 2.8 and situated at distance 1 from the selected pixel. Finally, the pixels 0.7, 0.9, 2.7 and 2.9 are regarded as being at distance 2 of the selected central pixel.

It would also be possible in a window with larger dimensions to define distances with values greater than.

By means of this example, it is possible to show that any processing of a pixel situated at a predetermined address requires, not only access to the data relating to this pixel situated at this predetermined address, but also and at least access to the data relating to pixels situated at addresses distance 1 and 2.

As indicated earlier, the known processing devices use memories in which the data is recorded as shown on the table of FIG. 1. This type of organization for addressing data in a memory presents the drawback of requiring a high number of processors and interconnections between these processors.

FIG. 2 is a table representing a helicoidal data addressing organization; this type of organization is used in the device of the invention. Here, the data is stored in four memories respectively connected to four identical processors. This principle developed for four processors may be extended to any number of processors.

These memories are called MEMO, MEM1, MEM2, MEM3 shown on the figure. Recorded at the first address of the first memory MEMO is the data which was recorded at the address 0.0 of the memory of FIG. 1. Recorded at the address 0 of the second memory MEM1 is the data which was recorded at the address 0.1 of the memory of FIG. 1, and so on for the third memory MEM3 in which recorded at the address is the data which was recorded at the address 0.3 of the memory of FIG. 1. Recorded at the address 1 of the memory MEMO is the data which was recorded at the address 0.4 of the memory of FIG. 1, and so on until the address 3 of the memory MEM3 in which is recorded the data which was recorded at the address 0.15 of the memory of FIG. 1. The data recorded at the addresses 0 to 3 corresponds in the example in question to the pixels of a first line of 16 pixels of this image.

For the second line of 16 pixels of this image, at the address 4 of the memory MEM1 the pixel data are recorded which were recorded at the address 1.0 of the memory of FIG. 1. At the address 4 of the memory MEM2, the pixel data are recorded which were recorded at the address 1.1. Also recorded at the address 4 of the memory MEMO are the pixel data which were recorded at the address 1.3 of the memory of FIG. 1. At the address 5 of the memory MEM1, the pixel data are recorded which were recorded at the address 1.4 of the memory of FIG. 1. And so on for the second line of the image with 16 pixels: the address 7 of the memory MEMO contains the data relating to the pixel which were recorded at the address 1.15 of the memory of FIG. 1.

For the third line, into the memory MEM2 at the address 8 of this memory shall be recorded the data relating to the pixel data which were recorded at the address 2.0 of the memory of FIG. 1.

This figure shows that when they pass from one line to another, the data relating to a first pixel of a line are recorded at an address of one of the memories, whereas the data relating to the first pixel of the next line is recorded in the next memory. This is why, for example, that the data relating to the first pixel of the third line (said data which was recorded at the address 2.0 of the memory of FIG. 1) is recorded at the address 8 of the memory MEM2, whereas the data relating to the first pixel of the fourth line (said data which was recorded at the address 3.0 of the memory of FIG. 1) is recorded at the address 12 of the memory MEM3.

Similarly, the data relating to the first pixel of the fifth line (said data which was recorded at the address 4.0 of the memory of FIG. 1) is recorded at the address 16 of the memory MEMO, etc).

If reference is now made to the processing window F of FIG. 1 and the element or central pixel which was recorded at the address 1.8 of the memory of FIG. 1, this pixel is now recorded at the address 6 of the memory MEM1. The data of the pixels at distance 2, said data being recorded at the addresses 0.9 and 2.7, are now respectively recorded at the addresses 2 and 9 of the memory MEM1. As a result in this example, the processor connected to the memory MEM1 has direct access to these pixels, which now occur situated at distance 0.

The data of the pixels, which were situated at distance 1 and which were recorded at the addresses 0.8 and 1.7 of the memory of FIG. 1, are now recorded respectively at the addresses 2 and 5 of the memory MEMO and remain at distance 1. The data of the other pixels at distance 1, which were recorded at the addresses 1.9 and 2.8, is now recorded respectively at the addresses 6 and 10 of the memory MEM2 and remain at distance 1. The processor, which shall process the data of the pixel 1.8, shall thus have access to the data of the pixels at distance 1 contained in the memories MEMO and MEM2 of the adjacent processors.

Similarly, the data of the pixels at distance 2, said data which was recorded at the addresses 0.7 and 2.9 of the memory of FIG. 1, is now recorded at the addresses 1 and 10 of the memory MEM3 and remain at distance 2. As a result, the processor, which processes the data of the pixel of the address 1.8, shall also have access to the memory MEM3 of the fourth processor so as to be able to process the pixels situated at distance 2.

This example shows that the minimum number of memories and processors needed to be disposed in order to process the pixels situated in a window with dimensions of 3×3 is equal to 4. This number is most suitable for forming images comprising 16 pixels per line, these pixels being situated at the conjunction of these lines with the same 16 columns. The example also shows that each row J processor (between 1 and 4) shall be connected, not only to its own memory, but also to the memories and to the adjacent processors of row J+1 and J−1, as well as to the memories and processors of row J+2 and J−2. These processors according to the invention are thus connected according to a looped line configuration. If one regards that the row J processor is connected to the memory MEM1, the row J+1 and J−1 processors at distance 1 are respectively connected to the memories MEM2 and MEM0, whereas the row J+2 processor at distance 2 is connected to the memory MEM3. The row J−2 processor at distance 2 is in fact the row J+1 processor in this example, since the processors are looped line connected.

Figure 3:
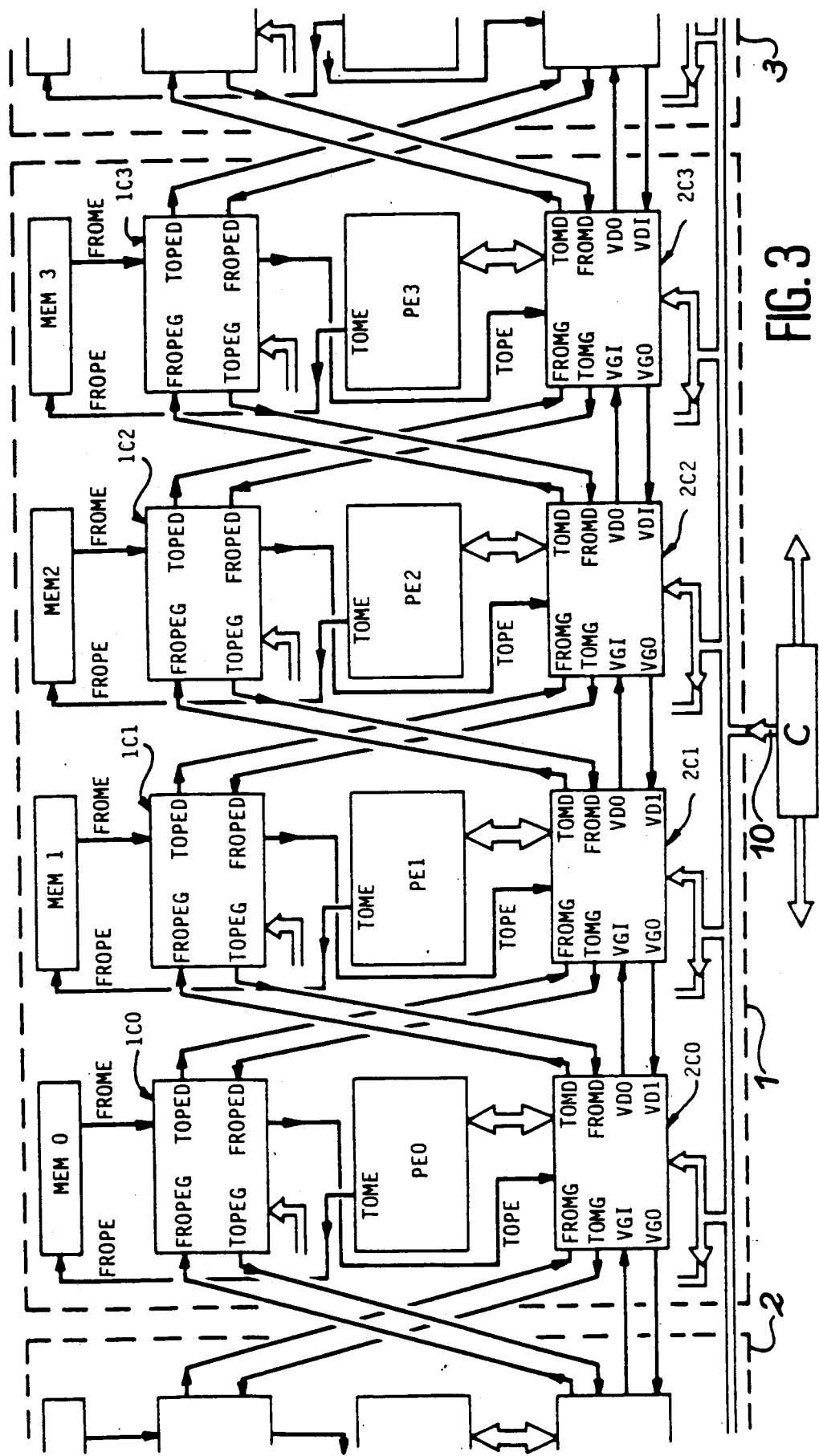

FIG. 3 diagrammatically shows a device for processing data relating to pixels according to the invention. This device comprises storing and processing means so as to carry out the processings of pixels situated in windows, each having at least 9 pixels. These pixels are situated on successive lines respectively belonging for each line to predetermined successive given columns in an image. The device shown diagrammatically at 1 on FIG. 3 makes it possible to process, for example, data relating to pixels of an image and situated at the conjunction of 16 lines and 16 columns; the processing means comprise at least one group of 4 identical processors PE0, PE1, PE2, PE3 marked from the row i=0 to the row i=3, and storage means constituted by memories MEM0, MEM1, MEM2, MEM3 respectively connected to these processors and marked from the row i=0 to the row i=3. In the example in question for processing the data of the pixels of an image of 16 lines and 16 columns, the contents of the memories are those indicated in the example in FIG. 2.

The data relating to the pixels of the predetermined lines and columns is stored in the memories MEM0, MEM1, MEM2, MEM3 according to the helicoidal addressing mentioned earlier. The processing means of the device 1 also comprise connections means so as to connect each processor to its memory and to interconnect each processor with each adjacent processor of the group of processors in question. These processors are interconnected, as shall be seen later in detail, according to their successive rows in accordance with a looped line configuration. The connection means shall be described later in detail. They are marked from the row i=0 to the row i=3 and are respectively shown on this figure for each by 1C0, 2C0 - 1C1, 2C1 - 1C2, 2C2 - 1C3, 2C3. These connections means are connected to a control unit C which allows for sequencing the addressing and processing operations carried out by the processors.

Also shown in this figure are two other devices 2, 3 identical to the device 1 so as to illustrate the modularity of the system, the image then being distributed according to the same principle relating to all the processors.

Each processor, such as PE1 for example, is directly connected to its memory MEM1 so as to enter, as shall be seen later in detail, data into this memory.

The connection means comprises for each processor a first switching circuit and a second switching circuit. For example, for the processor PE1, the first switching circuit is shown as 1C1, whereas the second switching circuit is represented as 2C1.

The first switching circuit 1C1 is connected to the memory MEM1 and to the processor PE1. The second switching circuit 2C1 is connected to the processor PE1. The first switching circuit of each processor, such as PE1 for example, is also connected to the second switching circuits 2C0, 2C2 of the two adjacent processors PE0, PE2 by means of bidirectional lines. Finally, the second switching circuit of each processor is connected to the second switching circuits of two adjacent processors. This is why, for example, the second switching circuit 2C1 of the processor PE1 is connected to the two switching circuits 2C0, 2C2 of the two adjacent processors PE0, PE2 by means of bidirectional lines.

As shall be seen later in detail, the first and second switching circuits of each processor comprise means which allow for:

a)—the transmission of data read in the memory of the processor to this processor. This is why, for example, the memory MEM1 of the processor PE1 is able to transmit data read in this memory to the processor by means of the FROME, TOPE link, b)—the transmission of the data supplied by the processor to the memory of this processor by means of the TOME, FROPE link, c)—the transmission of data read in the memory of a row J processor to a row J+1 processor. This is why, for example, the data read in the memory MEM1 of the row 1 processor PE1 is able to be transmitted to the row 2 processor PE2 (FROME, TOPED, FROMG link), d)—the transmission of data read in the memory of a row J processor to a row J−1 processor. This is why, for example, the data read in the memory of the row 2 processor MEM2 can be transmitted to the row 1 processor PE1 (FROME, TOPEG, FROMD link), e)—the transmission of the data supplied by a row J processor to a row J+1 processor. This is why, for example, the data supplied by the row 1 processor PE1 can be transmitted to the row 2 processor PE1 (TOMD, FROPED, TOPE link), f)—the transmission of data supplied by a row J processor to a row J−1 processor. Data supplied by, for example, the row 2 processor PE2 can be transmitted to the row 1 processor PE1 (TOMG, FROPED, TOPE link), g)—the transmission of the data from the memory of a row J processor to a row J+2 processor. Thus for example, data originating from the memory MEM0 of the row 0 processor may be transmitted to the row 2 processor PE2 (FROME, TOPED, VD0, VGI link), h)—the transmission of data from the memory of a row J processor to a row J−2 processor. Data may be transmitted, for example, from the memory MEM2 of the row 2 processor to the row 0 processor PE0 (FROME, TOPEG, FROMD, VG0, VDI link)

i)—the transmission of data of a row J processor to a row J+2 processor. For example, it is possible to transmit data from the row 0 processor PE0 to the row 2 processor PE2 (TOMD, FROPEG, TOPED, FROMG link), j)—the transmission of the data of a row J processor to a row J−2 processor. For example, it is possible to transmit data from the row 2 processor PE2 to the row 0 processor PE0 (TOMG, FROPED, TOPEG, FROMD link), k)—the transmission of data from a row J processor to a row J+3 processor. For example, it is thus possible to transmit data from the row 0 processor PE0 to the row 3 processor PE3 (TOMD, FROPEG, TOPED, FROMG, VDO, VGI link), l)—the transmission of data from a row J processor to a row J−3 processor. For example, thus it is possible to transmit data from the row 3 processor PE3 to the row 0 processor PE0 (TOMG, FROPED, TOPEG, FROMD, VGO, VDI link).

The links allowing for these various transmissions shall be described later in detail.

It is clear that, as the system is looped and comprises in the example in question only four processors and four memories marked from the row 0 to the row 3, the transmission of data of the row J=2 processor PE2, for example, to a row J+3 processor returns to a data transmission of the processor PE2 to the processor PE1 which occupies on the loop the third row after the processor PE2.

The different connections shown on this figure have the following significances for each processor, its memory, as well as the first and second switching circuits associated to it:

FROME denotes the paths of data transmitted by the memory to the processor through the first switching circuit (for example, 1C1 for the memory MEM1 and for the processor PE1), TOPE denotes the paths of data applied to the second switching circuit (for example, 2C1) in order to be transmitted to the processor PE1 and which are derived from the memory MEM1 (FROME data) after having traversed the first switching circuit 1C1), FROPEG/TOMD denotes the paths of data to the memory of a processor (for example, MEM1) derived from a processor situated more to the left (for example, PE0) in the group, FROMD/TOPEG denotes the paths from data of the memory MEM1, for example, of one processor to one processor (TOPEG) more to the left (for example, the processor PE0), TOMG/FROPED denotes the paths of data to the memory of a processor (for example, MEM0) derived (FROPED) from a processor more to the right (for example, PE1), TOPED/FROMG denotes data paths to a processor (for example, PE1) originating (FROMG) from the memory of a processor more to the left in the group (for example, MEM0), VDO, VGI denotes paths of data received by a processor (for example, PE1) originating (VDO) from a processor more to the left in the group (for example, PE0) (through the second switching circuits of these processors), VDI, VGO denote the paths of data received by a processor (for example, PE0) derived (VGO) from a processor more to the right in the group (for example, PE1) (through the second switching circuits of these processors).

The links allowing for these transmissions are diagrammatically shown on the figure and introduce the processors, the memories and the first and second switching circuits respectively connected to each of these processors. The switching circuits and their associated elements introduced in these transmissions shall be described later in detail.

Figure 4:
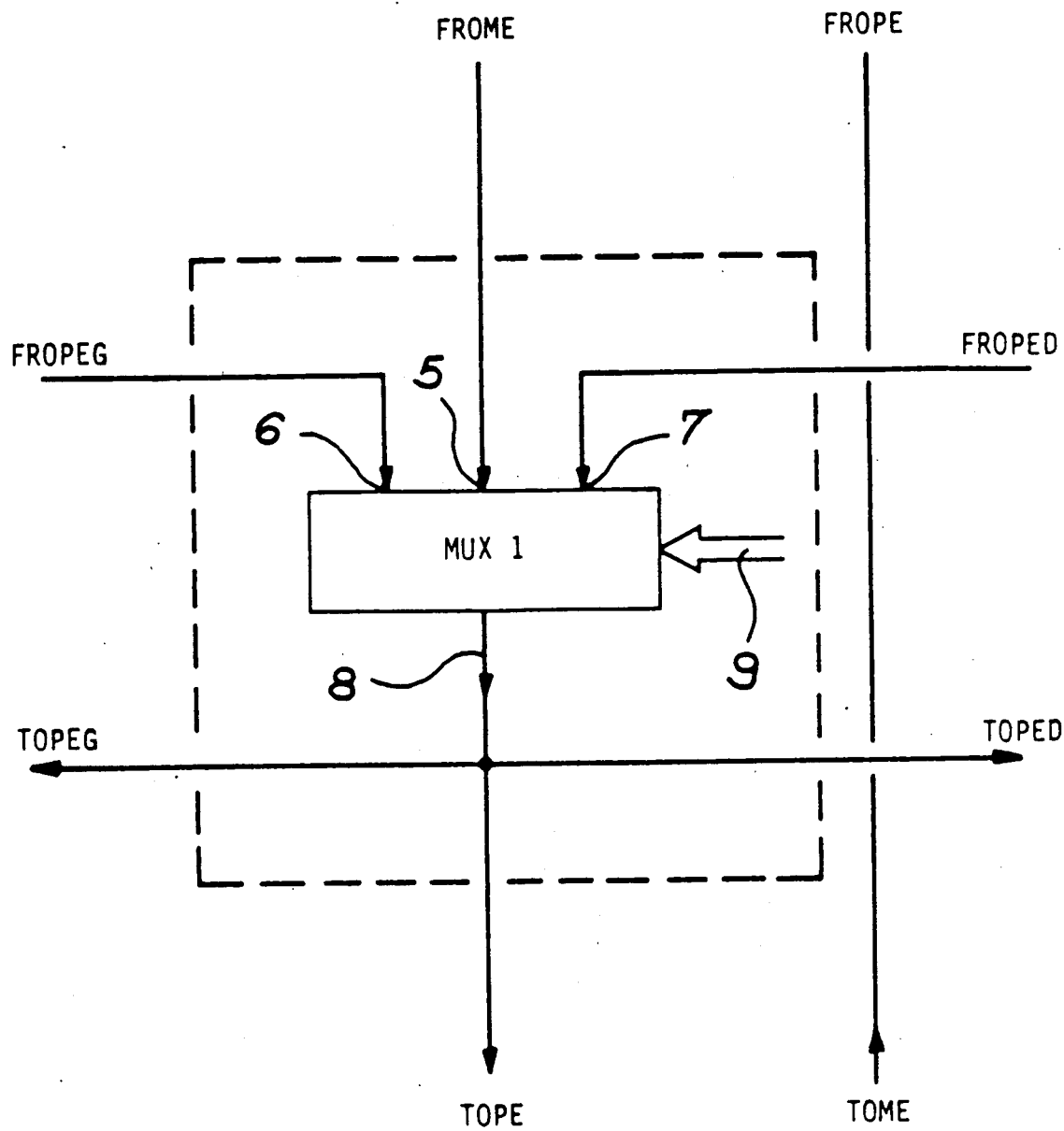

FIG. 4 diagrammatically shows the first switching circuit, such as 1C1 for example, of row 1 introduced into the device of the invention. The other switching circuits 1C0, 1C2, 1C3 are of course identical to that of FIG. 4. This row 1 switching circuit comprises, for example, a multiplexor MUX1 having a first input 5 connected to the memory MEM1 of the processor PE1 with the same row 1 in order to receive data (FROME) read from this memory. This multiplexor also comprises a second input 6 (FROPEG) connected to an output of the second switching circuit 2C0 (which shall be described later in detail) of row 0 in the example in question so as to receive data (TOMD) supplied by this second switching circuit. Finally, this multiplexor includes a third input 7 (FROPED) connected to an output of the second switching circuit 2C2 of row 2 in order to receive data (TOMG) supplied by this second switching circuit 2C2 of row 2.

The multiplexor MUX1 includes an output 8 which is connected (TOPE link) to the processor PE1 of the same row 1. This output 8 is also connected (TOPEG, FROMD link) to an input of the second switching circuit 2C0 of row 0. Finally, the output 8 is connected (TOPED, FROMG link) to an input of the second switching circuit 2C2 of row 2. This output supplies the data received by, for example, the multiplexor of row 1 on its inputs 5, 6 or 7, either to the processor PE1 of the same row, or to the second switching circuits 2C0 or 2C1 of row 0 or 2, according to the commands received on the inputs 9 connected to outputs 10 of the control means C (FIG. 1).

Figure 5:
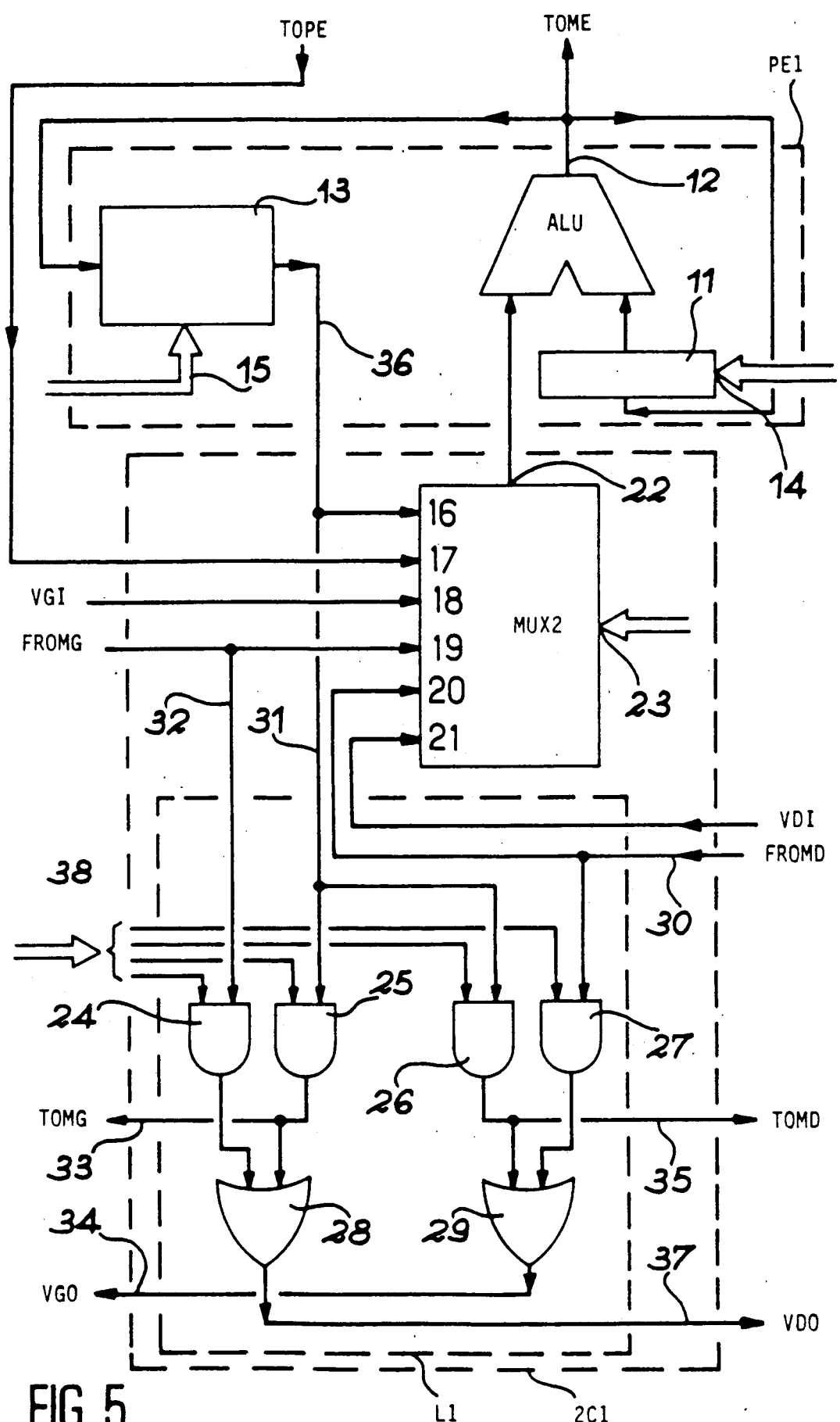

FIG. 5 diagrammatically represents one of the processors (for example, PE1 of row 1) used in the device of the invention, as well as a second switching circuit 2C1 introduced into this device. Diagrammatically represented on this figure, the processor PE1 includes, in an extremely diagrammatically known way, an arithmetic and logical unit ALU, and a latching circuit 11, one input of the latter being connected to an output 12 of the unit ALU. This output 12 is also connected to the memory MEM1 of the processor (TOME, FROPE link). The output of the locking circuit 11 is connected to an input of the unit ALU. This processor also includes a local memory 13 (generally formed of a block of registers), one input of which is connected to the output 12 of the unit ALU and one output 17 connected to the corresponding second switching circuit 2C1. The circuit 11 and the local memory 13 respectively comprise control inputs 14, 15 connected to the outputs 10 of the sequencing control unit C.

In a known way, the circuit 11 and the local memory 13 constitute buffer stores of the arithmetic and logical unit ALU.

For example, the second switching circuit 2C1 of row 1, as well as all the other switching circuits of different rows, comprise a multiplexor MUX2 which is connected by a first input 16 to the output 36 of the processor PE1 of the same row 1 in order to receive the data supplied by this processor and provisionally recorded in the block of registers 13. The multiplexor MUX2 also comprises a second input 17 connected to the output of the multiplexor MUX1 (TOPE link) of the same row 1 so as to receive data originating from the memory MEM1 of the same row (FROME link).

A third input and a fourth input 18, 19 of the multiplexor MUX2 are respectively connected to outputs of the second switching circuit (VGI, FROMG link) 2C0 of row 0 in order to respectively receive from this circuit data supplied either by the processor PE0 of row 0 or by the memory MEM0 of row 0.

A fifth input and a sixth input 20, 21 of the multiplexor MUX2 are respectively connected to outputs of the second switching circuit 2C2 (VDI, FROMD links) so as to respectively receive data supplied by the processor PE2 or by the memory MEM2 of row 2. An output 22 of this multiplexor is connected to an input of the processor PE1 of the same row 1 so as to transmit to the arithmetic and logical unit ALU of this processor some of the data received by the multiplexor. Control inputs 23 of the multiplexor MUX2 are connected to outputs 10 of the control unit C of FIG. 1.

The second switching circuit 2C1 of row 1 also comprises a logical circuit L1. This logical circuit, which is constituted, for example, by logical gates 24, 25, 26, 27 of the AND type and logical gates 28, 29 of the or type, whose connections are not described here in detail, have a first input 30 connected to an output of the second switching circuit 2C2 of row 2 (FROMD link) so as to receive data supplied by the memory MEM2 of row 2.

The logical circuit L1 also has a second input 31 connected to the output 36 of the processor PE1 of the same row 1 in order to receive data supplied by this processor. This circuit also has a third input 32 connected to an output of the second switching circuit 2C0 (FROMG link) of row 0 so as to receive data supplied by the memory MEM0 of row 0.

The logical circuit L1 has two outputs respectively connected (TOMG, VGO links) to two inputs of the second switching circuit 2C0 of row 0 so as to supply data to the memory MEM0 and to the processor PE0 of row 0.

The second switching circuit 2C1 also has two other outputs 35, 37 respectively connected (TOMD, VDO links) to two inputs of the second switching circuit 2C2 of row 2 so as to supply data to the memory MEM2 and to the processor PE2 of row 2.

The circuit L1 also has control inputs 38 of the gates which constitute it. These inputs are connected to control outputs 10 of the control unit C of FIG. 1.

The first and second switching circuits, such as those just described and which are identical from row 0 to row 4, make it possible to carry out the operations a to l listed above:

a)—the transmission of data read in a memory of row J to the processor of the same row is carried out as follows: a command is applied to the multiplexor MUX1 on its input 9 and the FROME, TOPE link is established through the multiplexor MUX2 which receives the command required on its input 23.

b)—the transmission of data supplied by a row J processor to the memory of the same row is directly established by the TOME, FROPE link.

c)—the transmission of data read in the memory of a row J processor to a row J+1 processor is established as follows: suppose, for example, that the data is to be transmitted from the memory MEM0 of the row 0 processor to the processor PE1 of row 1. By means of the multiplexor MUX1, the first switching circuit 1C0 establishes the FROME, TOPED, FROMG link with the multiplexor MUX2 of the second switching circuit 2C1 of row 1. A command applied to the input 23 of this multiplexor makes it possible to transmit the data originating from the memory MEM0 to the processor PE1.

d)—This operation consists of transmitting data read in the memory of a row J processor to a row J−1 processor. For example, it is deemed necessary to transfer the data of the memory MEM1 of row 1 to the processor PE0 of row 0. In order to do this, the multiplexor MUX1 of the first switching circuit 1C1 establishes the FROME, TOPEG, FROMD connection between the memory MEM1 and the multiplexor MUX2 of the second switching circuit 2C0. An order applied to the control input 23 of this multiplexor allows for transmission of the data orginating from the memory MEM1 to the processor PE0.

e)—This operation consists of transmitting the data supplied by a row J processor to a row J+1 processor.

This operation occurs when it is desired, for example, to transmit the data of the procesor PE0 of row 0 to the processor PE1 of row 1. To this effect, the data supplied by the output 36 of the processor PE0 are applied to the logical circuit L0 of the second switching circuit 2C0, which establishes the connection TOMD between this second switching circuit 2C0 and the first switching circuit 1C1 of row 1. The multiplexor MUX1 then establishes the connection FROPEG, TOPE between this first switching circuit 1C1 of row 1 and the corresponding processor PE1 via the multiplexor MUX2 of the second switching circuit 2C1 of row 1.

f)—This operation consists of transmitting the data supplied by a row J processor to a row J−1 processor. For example, this operation occurs when it is desired to transmit data of the row 1 processor PE1 to the row 0 processor PE0. To this effect, the second switching circuit 2C1 of the processor PE1 establishes the TOMG, FROPED connection between this second switching circuit and the multiplexor MUX1 of the first switching circuit 1C0 of row 0. This multiplexor then establishes the TOPE link with the multiplexor MUX2 of the second switching circuit 2C0 of row 0 connected to the processor PE0.

g)—This operation consists of transmitting data of the memory of a row J processor to a row J+2 processor. This applies, for example, when it is desired to transmit the data of the memory MEM0 of the PE0 processor to the processor PE2 of row 2. To this effect, the first switching circuit 1C0 connected to the memory MEM0 establishes, by means of the multiplexor MUX1, the FROME, TOPED, FROMG connection with the second switching circuit 2C1 of row 1. The second switching circuit 2C1 of row 1 then establishes the FROMG, VDO, VGI connection with the second switching circuit 2C2 of row 2. The multiplexor MUX2 of the second switching circuit 2C2 then allows for the transmission of the data received to the processor PE2.

h)—This operation consists of transmitting the data of the memory of a row J processor to a row J−2 processor. This applies, for example, when it is required to transmit data of the the memory MEM2 of the processor PE2 to the processor PE0 of row 0. To this effect, the first switching circuit 1C2 establishes the FROME, TOPEG, FROMD link between the memory MEM2 of row 2 and the second switching circuit 2C1 of row 1. This second switching circuit 2C1 then establishes the FROMD, VGO, VDI link with the second switching circuit 2C0 of the row O processor. The multiplexor MUX2 then transmits the data to the processor PE0.

i)—This operation consists of transmitting the data of a row J processor to a row J+2 processor. This applies, for example, when it is required to transmit the data of the row 0 processor PE0 to the row 2 processor PE2. To this effect, the second switching circuit 2C0 of the processor PE0 establishes the TOMD, FROPEG link between this circuit and the first switching circuit 1C1 of the row 1 processor PE1. This first switching circuit 1C1 establishes the FROPEG, TOPED, FROMG link via the multiplexor MUX1 with the second switching circuit 2C2 of the row 2 processor. The multiplexor MUX2 of the switching circuit 2C2 then establishes the link with the row 2 processor PE2.

j)—This operation consists of transmitting the data of a row J processor to a row J−2 processor. This thus applies when it is required to transmit data of the row 2 processor PE2 to the row 0 processor PE0. To this effect, the second switching circuit 2C2 of the processor PE2 establishes the TOMG, FROPED connection with the first switching circuit 1C1 of the row 1 processor. The multiplexor MUX1 of the first switching circuit 1C1 then establishes the FROPED, TOPEG, FROMD connection with the second switching circuit 2C0 of the row 0 processor. This second switching circuit 2C0 then establishes, via the multiplexor MUX2, the link with the processor PE0.

k)—This operation consists of transmitting the data of a row J processor to a row J+3 processor. This applies, for example, when it is required to transmit the data of the row 0 processor PE0 to the row 3 processor PE3. To this effect, the second switching circuit 2C0 of the processor PE0 establishes the TOMD, FROPEG link with the first switching circuit 1C1 of the row 1 processor PE1. By means of its multiplexor MUX1, this first switching circuit establishes the FROPEG, TOPED, FROMG link with the second switching circuit 2C2 of the row 2 processor PE2. The second switching circuit 2C2 of the row 2 processor PE2 establishes the FROMG, VDO, VGI connection with the second switching circuit 2C3 of the row 3 processor PE3. The multiplexor MUX2 of this second switching circuit 2C3 then establishes the connection with the corresponding processor PE3. The data originating from the processor PE0 is thus transmitted to the processor PE3.

l)—This operation consists of transmitting the data of a row J processor to a row J−3 processor. This applies, for example, when it is required to transmit the data of a row 3 processor to the row 0 processor PE0. To this effect, the second switching circuit 2C3 of the processor PE3 establishes the TOMG, FROPED connection with the first switching circuit 1C2 of the row 2 processor PE2. The multiplexor MUX1 of this first circuit 1C2 establishes the FROPED, TOPEG, FROMD connection with the second switching circuit 2C1 of the row 1 processor. This second switching circuit establishes the FROMD, VGO, VDI connection with the second switching circuit 2C0 of the processor PE0. The multiplexor MUX2 of this second switching circuit 2C0 then transmits the data to the processor PE0.

The device just described makes it possible to clearly establish the aforesaid interconnections and in particular enables each processor to read at the desired addresses in the memories of each of the processors the data required to carry out the processing of a pixel according to the data relating to the surrounding pixels, especially for a window with dimensions of 3×3. This device properly possesses a looped line connection configuration, since each processor may communicate with the next processor on each line and the final processor of the line can communicate with the first processor of this line.

The operations described above are carried out simultaneously on all the processors. This is why, for example, when the processor j transmits its data to the processor j+3, the processor j+1 carries out the same operation with its data transmitted to the processor j+4, and so on.

What is claimed is:

1. A device for processing data relating to pixels marked by lines and by columns comprising means for memorizing data, and means for processing data relating to each of these pixels according to data relating to each of the pixels situated at least in the immediate environment of the processed pixel so as to process the data relating to pixels situated inside windows each having at least nine pixels, wherein the processing means comprise at least one group of four identical processors marked from the row j=0 to the row j=3 so as to process the pixels situated on successive lines and respectively belonging to the same predetermined column, the memorization means comprising at least four memories marked from at least the row j=0 to the row j=3 and respectively connected to the processors, the data relating to the pixels of the predetermined lines and columns being registered in these memories according to a "helicoidal" addressing, the processing means also comprising connection means marked from at least the row i=0 to the row i=3 so as to connect each processor to its memory and so as to interconnect each processor with each adjacent processor of the group so that the processors are interconnected according to their successive rows in a looped configuration, the connection means also being connected to a control unit for sequencing the addressing and processing operations carried out by the processors, wherein each processor is connected directly to its memory so as to enter data in this memory, the connection means comprising for each processor a first switching circuit and a second switching circuit, each connected to a sequencing unit, each first switching circuit being also connected to the memory and processor, each second switching circuit being connected to the processor, said first switching circuit of each processor being connected to the second switching circuits of two adjacent processors by means of bidirectional lines, and the second switching circuit of each processor being connected to the second switching circuits of two adjacent processors by means of bidirectional lines, the first and second switching circuits of each row J processor between at least j=0 and j=3 comprising:

a)—means for transmitting data read in the memory of the processor to this processor;

b)—means for transmitting data supplied by the processor to the memory of this processor;

c)—means for transmitting data read in the memory of a row J processor to a row J+1 processor;

d)—means for transmitting data read in the memory of a row J processor to a row J-1 processor;

e)—means for transmitting data supplied by a row J processor to a row J+1 processor;

f)—means for transmitting data supplied by a row J processor to a row J−1 processor;

g)—means for transmitting the data of the memory of a row J processor to a row J+2 processor;

h)—means for transmitting the data of the memory of a row J processor to a row J−2 processor;

i)—means for transmitting the data of a row J processor to a row J+2 processor;

j)—means for transmitting the data of a row J processor to a row J−2 processor;

k)—means for transmitting the data of a row J processor to a row J+3 processor; and l)—means for transmitting the data of a row J processor to a row J−3 processor.

2. A device according to claim 1, wherein each first switching circuit of row J comprises a multiplexor having a first input connected to the memory of the row J processor in order to receive data read in this memory, a second input connected to an output of the second switching circuit of row J−1 so as to receive data supplied by this second switching circuit of row J−1, and a third input connected to an output of the second switching circuit of row J+1 so as to receive data supplied by this second switching circuit of row J+1, this multiplexor comprising an output connected to an input of the row J processor, to an input of the second switching circuit of row J−1 and to an input of the second switching circuit of row J+1 so as to supply the data received by the multiplexor to the row J processor or to the second switching circuits of rows J−1 or J+1 according to sequencing commands received on control inputs of the multiplexor and connected to outputs of the sequencing means.

3. A device according to claim 2, wherein each second switching circuit of row J comprises a multiplexor respectively connected by a first input to an output of the row J processor in order to receive data supplied by this processor, a second input connected to the output of the multiplexor of the first switching circuit of row J so as to receive data originating from the row J memory, a third input and a fourth input respectively connected to outputs of the second switching circuit of row J−1 so as to respectively receive data supplied by the row J−1 processor and by the row J−1 memory, a fifth input and a sixth input respectively connected to outputs of the second switching circuit of row J+1 in order to respectively receive the data supplied by the processor and the memory of row J+1, an output of this multiplexor being connected to an input of the row J processor, this second switching circuit of row J also comprising a logical circuit having a first input connected to an output of the second switching circuit of row J+1 so as to receive data supplied by the memory of row J+1, a second input connected to an output of the row J processor in order to receive data supplied by this processor, and a third input connected to an output of the second switching circuit of row J−1 in order to receive data supplied by the memory of row J−1, this logical circuit having two outputs respectively connected to two inputs of the second switching circuit of row J−1 in order to supply data to the memory and processor of row J−1, and having two other outputs respectively connected to two inputs of the second switching circuit of row J+1 so as to supply data to the memory and processor of row J+1, the logical circuit and the multiplexor of the second switching circuit of row J being connected by control inputs to outputs of the sequencing unit so as to manage the sequencings of data supplied by the outputs of the logical circuit and by the multiplexor of the second switching circuit of row J.

* * * * *